Figure 1:
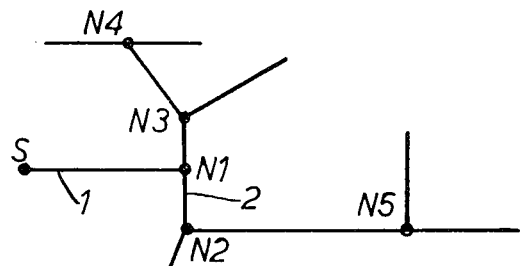

United States Patent [19]
Tyler et al.

[11] 3,947,807
[45] Mar. 30, 1976

[54] VEHICLE LOCATION SYSTEMS

[75] Inventors: Ronald Arthur Tyler; Luigi de Tullio, both of Chelmsford, England

[73] Assignee: The Marconi Company Limited, Chelmsford, England

[22] Filed: Aug. 22, 1975

[21] Appl. No.: 606,955

Related U.S. Application Data

[63] Continuation-in-part of Ser. No. 410,267, Oct. 26, 1973, abandoned.

[30] Foreign Application Priority Data

Oct. 28, 1972 United Kingdom............... 49831/72

[52] U.S. Cl. ............... 340/23; 235/150.24; 325/53; 343/6.5 LC; 343/112 TC
[51] Int. Cl.² .... G01S 9/02; G01S 9/56; G08G 1/12
[58] Field of Search ............ 325/53, 54; 340/23, 24; 343/6.5 R, 6.5 LC, 112 TC; 235/150.24

[56] References Cited
UNITED STATES PATENTS

| | | | |
|---|---|---|---|
| 3,281,789 | 10/1966 | Willcox et al..................... | 325/53 X |
| 3,568,161 | 3/1971 | Knickel..................... | 343/112 TC X |
| 3,644,883 | 2/1972 | Borman et al................. | 343/6.5 LC |
| 3,646,580 | 2/1972 | Fuller et al. ............... | 343/112 TC X |
| 3,681,752 | 8/1972 | Cuddihy............................. | 340/24 |
| 3,757,290 | 9/1973 | Ross et al. ........................... | 340/23 |

*Primary Examiner*—Malcolm F. Hubler
*Attorney, Agent, or Firm*—Baldwin, Wight & Brown

[57] ABSTRACT

A vehicle location system for vehicles travelling over a predetermined route in which the vehicle sends to a base station information concerning the distance travelled from a predetermined starting point and the turns made, from which information the base station computes the route between road junctions, on which the vehicle is travelling.

10 Claims, 7 Drawing Figures

VEHICLE LOCATION SYSTEMS

This is a continuation-in-part of U.S. Application No. 410,267, filed on Oct. 26, 1973 now abandoned.

This invention relates to vehicle location systems and more particularly to systems for locating vehicles travelling over a predetermined network of roads.

While particularly applicable to wheeled vehicles travelling over networks of roads, the invention is not limited to this application.

According to this invention a vehicle location system for locating a vehicle travelling over a predetermined network of routes comprises vehicle borne means for deriving information signals relating to the distance travelled by the vehicle, means for deriving information signals relating to changes in the direction of travel of the vehicle and means for transmitting both information signals to a base station, and at said base station means for receiving said information signals, and means for computing from said received information signals and from stored signals representing distance between route junctions the route between junctions on which the vehicle is travelling.

Preferably means are provided at said base station for determining the distance of the vehicle from the junction to which the vehicle is heading.

Preferably said last mentioned means comprises a store, means for entering into said store a binary signal representing the distance between a junction being negotiated by said vehicle and a junction towards which the vehicle is heading, and means for emptying said store in response to distance travelled information signals received from said vehicle.

Figure 2:
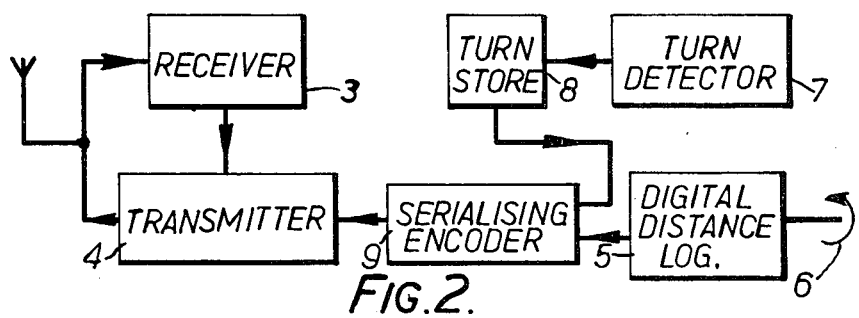
Figure 3:
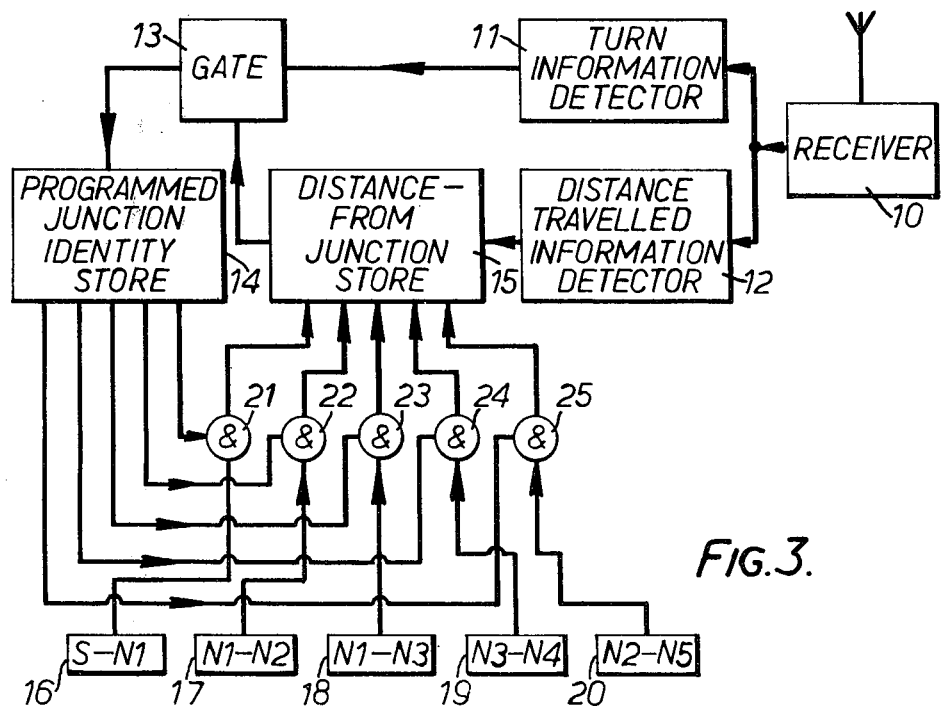
Figure 4:
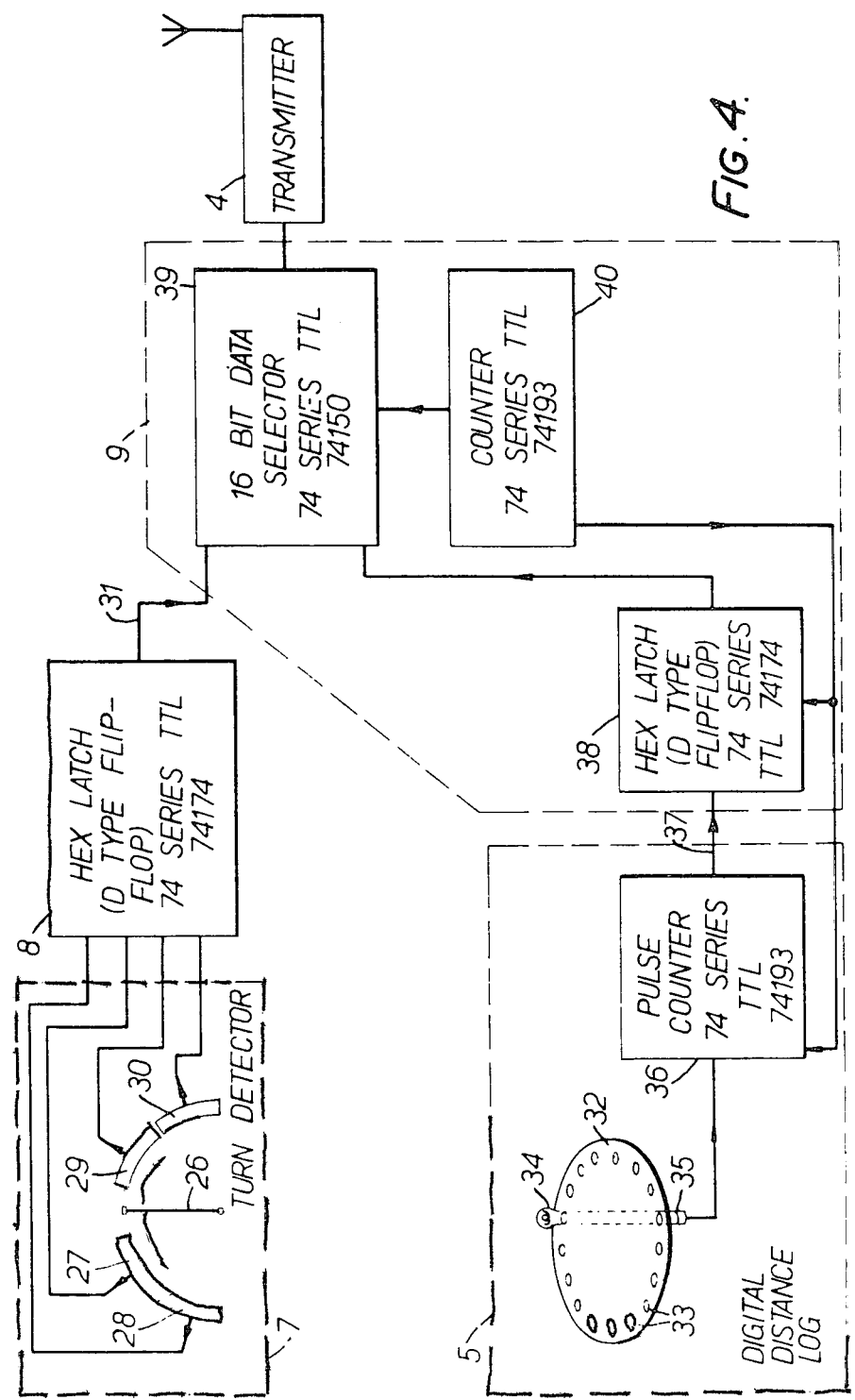
Figure 5:
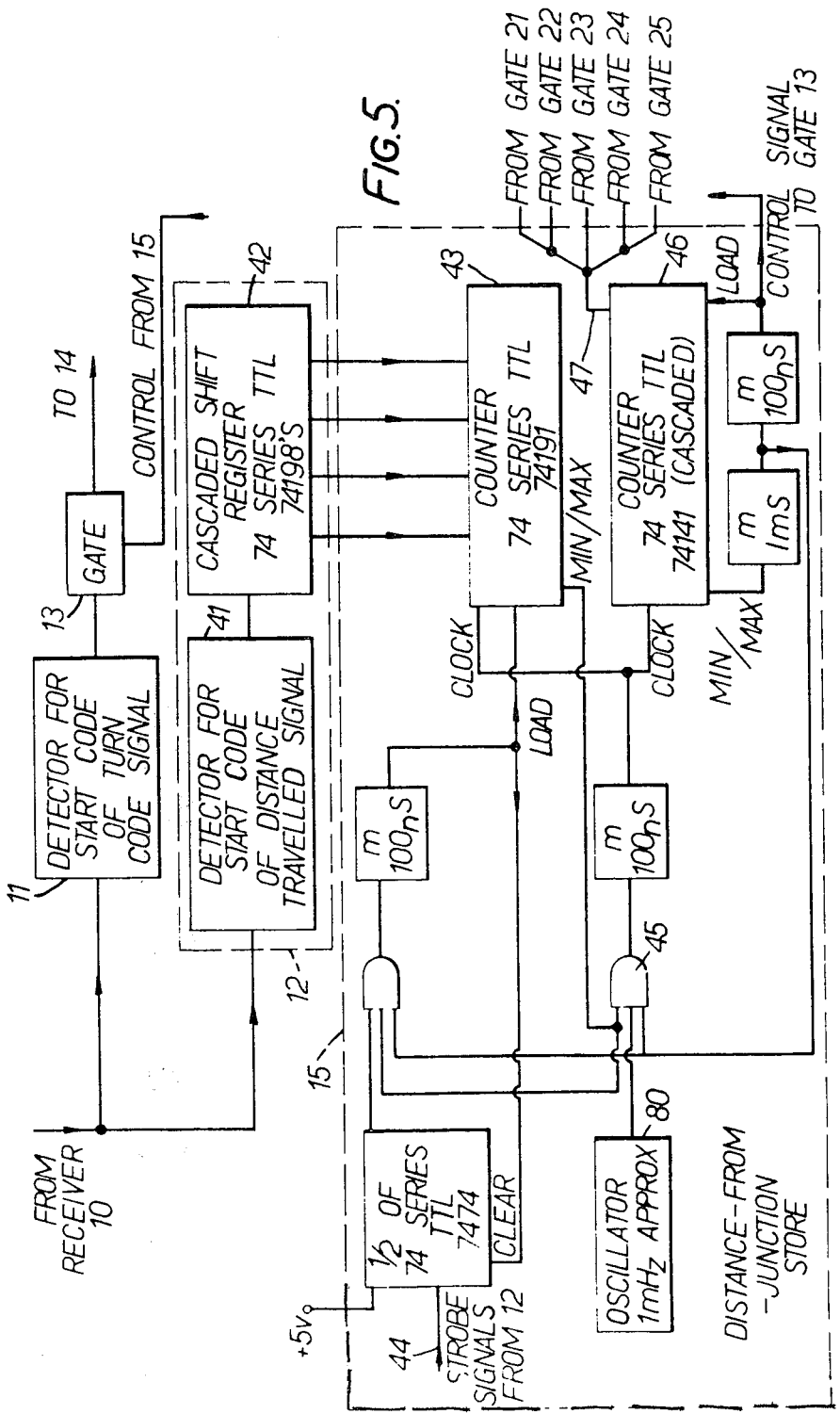
Figure 6:
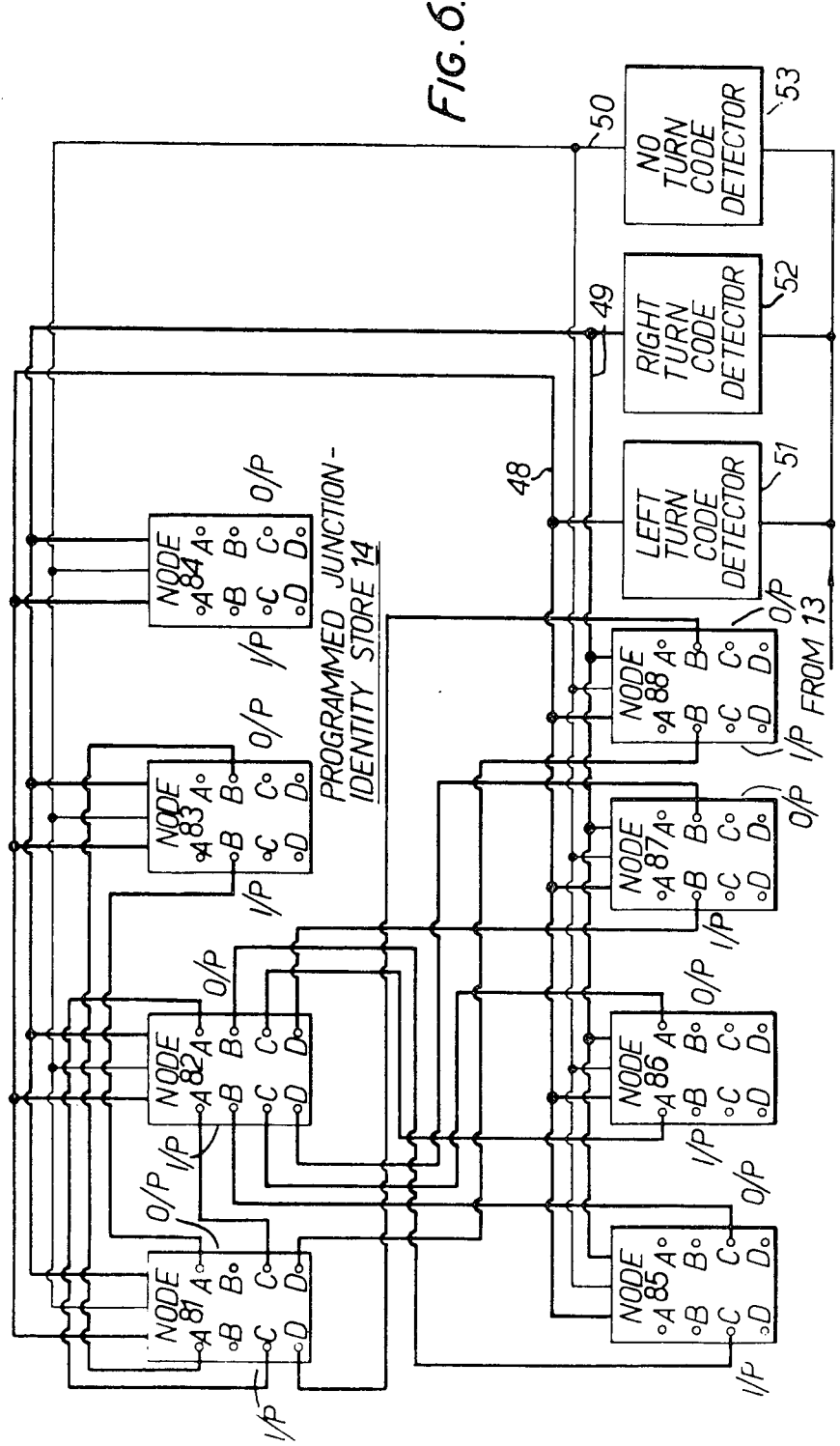
Figure 7:
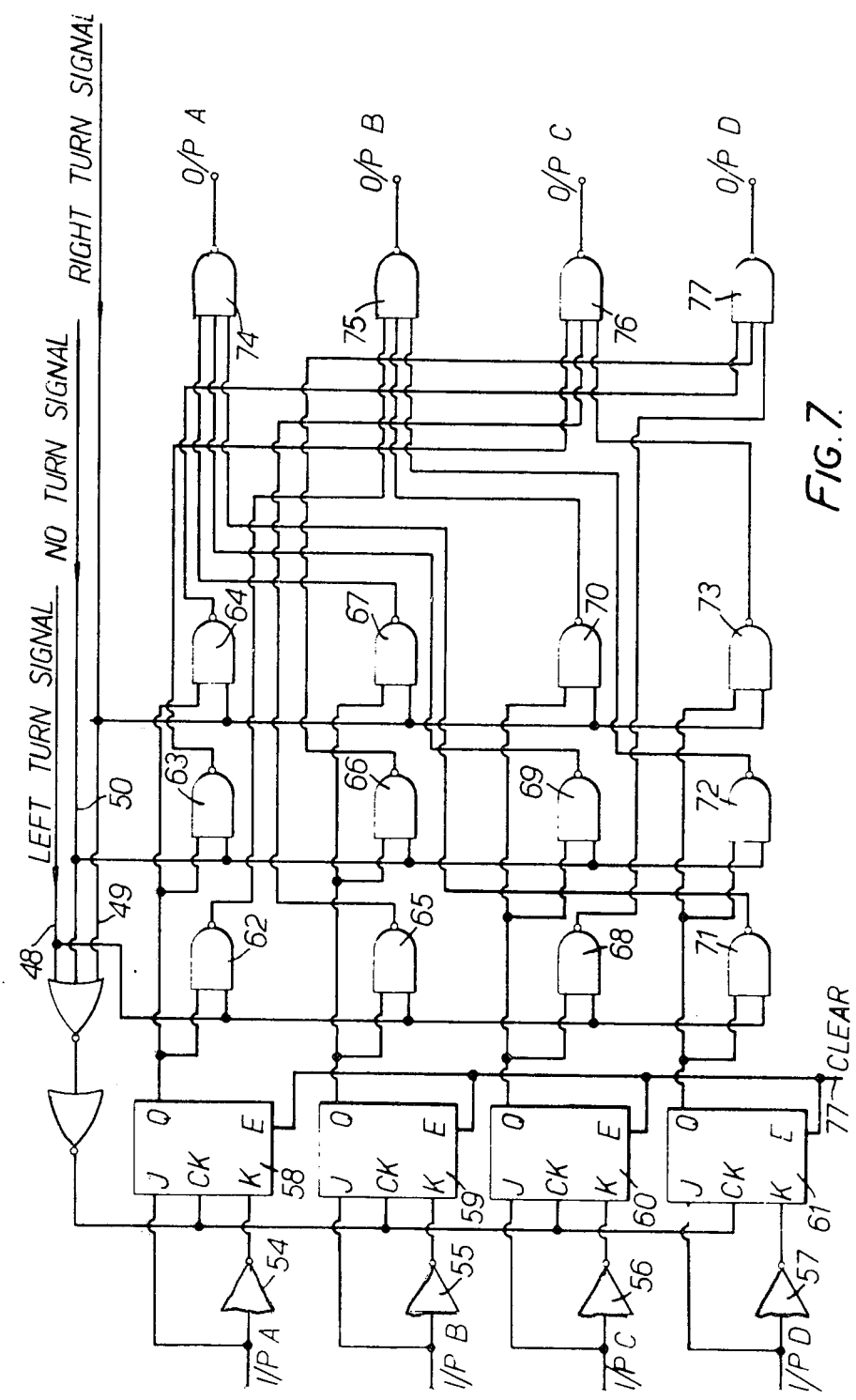

The invention is illustrated in and further described with reference to the accompanying drawings in which, FIG. 1 is a diagram of a simple road network, FIG. 2 is a block diagram of a vehicle borne arrangement co-operating with a base station, FIG. 3 is a block diagram of a base station in a simple system in accordance with the present invention, FIG. 4 schematically represents in greater detail the turn detector referenced 7 in FIG. 2, the digital distance log referenced 5 in FIG. 2 and the arrangement of the serialising encoder referenced 9 in FIG. 2, FIG. 5 schematically represents in greater detail "distance from junction" store referenced 15 in FIG. 3, FIG. 6 schematically represents in greater detail programmed junction identity store referenced 14 in FIG. 3 and FIG. 7 schematically represents in greater detail each individual logic circuit in FIG. 6.

Referring to FIG. 1, the network consists of a number of roads such as 1, 2 extending between junctions N1 to N5 at which two or more roads join. S is an arbitrarily chosen starting point, which may or may not be the location of the base station of FIG. 3, from which a vehicle or vehicles co-operating with the system is or are to be tracked.

Referring to FIG. 2, the vehicle borne equipment consists of a receiver 3 provided to receive interrogating signals from the base station of FIG. 3. The receiver 3 is connected to trigger a transmitter 4 upon receipt of such interrogating signals. Thereupon transmitter 4 transmits to the base station a code signal consisting of "distance travelled" information and "direction of turn" information. The distance travelled information is derived from a digital distance log 5 driven, as represented by the arrow 6, in synchronism with the road wheels of the vehicle (assuming the vehicle to be wheeled). Turn information is derived from a turn detector 7 which in the simplest case may be connected to the steering gear of the vehicle to provide indication of left or right turn and the extent, in terms of degrees of such turn. Output from the turn detector 7 is stored in a store 8. Information signals from the turn store 8 and the digital distance log 5 are serialised in a serialising encoder 9 before being applied to the transmitter 4. In a practical case where more than one vehicle is to be tracked, the receiver 3 of each vehicle would include a code detector so as to ensure that the vehicle borne equipment responded only to interrogating signals, suitably coded, intended for that vehicle.

Referring to FIG. 3, it will be assumed for the moment that only a single vehicle is to be tracked. A receiver 10 is provided to receive information signals transmitted by the vehicle borne equipment of FIG. 2. The output of receiver 10 is connected in parallel to a turn information detector 11 provided to detect turn information signals originating from turn store 8 and a distance travelled information detector 12 provided to detect signals originating from the digital distance log 5. Output from the turn information detector 11 is applied via a gate 13, which is normally closed, to a programmed junction identity store 14, the nature of which will be apparent presently.

Output signals from the distance travelled information detector 12 is connected to a "distance from junction" store 15 in order to cause this store to count down. The initial count of store 15 is representative of the distance from a junction the vehicle last negotiated to the junction the vehicle is approaching. An output signal is derived from the "distance from junction" store 15 when the count in that store becomes zero, which output signal is applied to open gate 13.

The initial count written into store 15 is derived from one of a number of permanent memory stores 16 to 20, via AND gates 21 to 25, when those gates are opened under the control of the programmed junction identity store 14. Permanent memory store 16 records the distance between the starting point S and the first junction N1, stored 17 the distance between junction N1 and junction N2, store 18 the distance between junction N1 and N3, store 19 the distance between junction N3 and N4 and store 20 the distance between junction N2 and N5.

Programmed junction identity store 14 is programmed such that from the initial starting point S, and assuming a heating towards N1, output signals are provided to open gate 21 and so write into "distance from junction" store 15, a count representing the distance between the starting point S and the junction N1. At the same time an indication is provided, visually for example, that the junction to which the vehicle is heading is junction N1. Upon receipt of turn information received from turn information detector 11, via gate 13, programmed junction identity store 14 computes the junction to which the vehicle is now heading, e.g. junction N2, and opens the appropriate AND gate, in this case AND gate 22, in order to enter into "distance from junction" store 15, a count representing the distance between junctions N1 and N2. At the same time the indication of the junction to which the vehicle is heading is changed from N1 to N2.

As has already been mentioned, gate 13 is only opened as the count of "distance from junction" store 15 is reduced to zero. This provides, as it were, a range gate with the object of ensuring that the turn information applied to programmed junction identity store 14 is turn information relating to the vehicles maneuver at the junction. In practice the turn information derived at the vehicle is integrated over a distance such that the turn information transmitted to the base station relates to the overall maneuver and tends to ignore any unavoidable changes in steering direction which may be made during the maneuver. Thus at any time junction identity store 14 provides an indication of the junction to which the vehicle is heading and "distance from junction" store 15 an indication of the distance the vehicle has to travel to reach the junction.

Where, as would normally be the case in practice, a plurality of vehicles are to be tracked over a given network of roads, use would be made of a "round-robin" interrogation and reply technique (for example as set out in our co-pending application No. 38416/69, British Pat. No. 1,310,679), in which each of the vehicles is interrogated in turn. At the base station turn information detectors such as 11, distance travelled information detectors such as 12, "distance from junction" stores such as 15, gates 13 and 21 to 25 would be provided in respect of each vehicle. Programmed junction identity store 14 would also, of course, increase in complexity in order that the appropriate ones of the individual sets of gates 21 to 25 were opened as required to upgrade the "distance from junction" information stored in the appropriate "distance from junction" stores 15.

In a practical example of the arrangement the average interrogation time allocated to each vehicle was 26.7 milliseconds. During this time up to 18 digital bits of useful information were received by the base station. The upper limit of the number of vehicles which may be associated with the system is therefore limited more by saturation of the communication channel, than by saturation of the data processing equipment at the base station.

The time interval between successive interrogations of the same vehicle if a "round-robin" interrogation technique is used is given by the product of the average interrogation time and the number of vehicles. The time interval should, of course, be sufficiently short to make it possible to follow the progress of the vehicle along a network branch and in particular to detect its arrival at the junction to which the vehicle is heading, where a turn is to be made. In practice the system would be designed to account for "worst case" conditions, looking at the shortest length of road between two junctions and the maximum speed which would be attained by the fastest vehicle so as to set the maximum value on the time interval between successive interrogations of the same vehicle. In practice is is believed that this should not be longer than 3 to 4 seconds and for practical purposes no more than 100 to 150 vehicles should be associated with one data processing system as shown in FIG. 3.

These figures could be extended in a number of different ways. For example, the vehicles may be allowed to traverse several road junctions, thereby possibly effecting a number of turns between interrogations, the storage facilities at the vehicle being extended to store this information until the vehicle is interrogated. In addition the time interval between interrogations could be arranged differently for different vehicles so as to take into account different likely attainable speeds, or pre-knowledge of the distance between junctions over the route that the vehicle should be following. Furthermore a number of radio link channels could be provided feeding the one data processing arrangement.

So far as the digital distance log 5 of FIG. 2 is concerned in a practical case, the use of a shaft encoder is envisaged which would provide 1,024 increments every 5 miles, so as to provide a resolution in the distance indication of approximately 26 feet for a change of 1 unit in the least significant digit. In order to reduce the amount of data transmission time utilized by any one vehicle, the change of heading during maneuver may be regarded as a step function. In some cases, for example, in addition to indicating whether the turn is to the left or to the right, it may only be necessary to identify the degree of turn in steps of 22½°, or even 45°, in order for the programmed junction identity store 14 to compute the junction to which the vehicle is heading after a maneuver. While the turn detector 7 may be driven directly from the steering mechanism of the vehicle as previously described, an alternative method would be to compare the difference in wheel revolutions between an inside and an outside wheel, which occurs as a vehicle is involved in a turning maneuver.

Referring to FIG. 4, the turn detector 7 of FIG. 2, in this particular example is such as to provide electrical signals representative of turns from 15° to 45° left, of greater than 45° left, from 15° to 45° right and of greater than 45° right. To achieve this a rotary switch is provided, which has a wiper 26 movable clockwise or anti clockwise from a median position shown in dependence upon movement of the steering gear of the vehicle to contact one of four arcuate contacts 27, 28, 29 and 30. Each of the arcuate contacts 27 to 30 is connected to an input of a "hex latch" otherewise called a D type flip flop, (74 series TTL logic circuit reference 74174) which corresponds to the turn store 8 of FIG. 2. The output of hex latch 8 is connected to lead 31 which is connected to one input of serialising encoder 9.

The digital distance log 5 in this particular example in essence consists of a perforated disc 32 which is rotated in synchronism with the road wheels of the vehicle. The apertures 33 in the disc 32 are arranged to move between an illuminating source 34 and a photo-electric detector 35, which latter thus produces a series of pulses whose pulse repetition frequency corresponds to the speed of the vehicle. The output of photoelectric detector 35 is connected to a pulse counter 36, which may, for example be a 74 series TTL logic circuit reference 74193. The output of pulse counter 36 is connected to lead 37 which is connected to the second input of serialising encoder 9.

The serialising encoder 9 itself consists of a hex latch 38 which again may be constituted by a 74 series TTL logic circuit reference 74174; a 16 bit data selector 39 constituted by a 74 series TTL logic circuit reference 74150; and a counter 40 constituted by a 74 series TTL logic circuit reference 74193. The input of hex latch 39 is connected to the aforementioned second input of the serialising encoder 9 and thus receives input from pulse counter 36 in digital distance log 5. Both hex latch 38 and hex latch (turn store) 8 are addressed by the 16 bit data selector 39 under the control of counter 40 which is also utilised to provide clock signals to hex latch 38 and pulse counter 36.

Referring to FIG. 5, in this particular example distance travelled information detector 12 consists of a detector 41 which detects the start code of the distance travelled data signal received by receiver 10 and which is connected to a cascaded shift register 42 (constituted by a required number of 74 series TTL logic circuits reference 74198 connected in cascade) which will thus be loaded upon detector 41 recognising the distance travelled information start code.

Within the "distance from junction" store 15, there is a counter 43 constituted by a 74 series TTL logic circuit reference 74191 which receives distance travelled information from shift register 42 in four bits parallel binary form which information is loaded into counter 43 by a strobe signal applied to lead 44 and derived from distance travelled information detector 12. Clock signals for causing counter 43 to count downwards are provided by a 1 MHz (approx.) oscillator 80 through a gate 45. The same clock signals are used to cause a second counter 46 to count down so that counters 43 and 46 are clocked down in parallel. Counter 46 is constituted by a required number of 74 series TTL logic circuits reference 74191 connected in cascade. Counter 46 derives its initial count an inter-junction distance from input lead 47 which, as represented, is connected to each of the AND gates 21 to 25 to FIG. 3.

When the count of counter 43 reaches zero indicating that the distance travelled information has been effectively substracted from the distance to next junction contained in counter 46, the counter 43 provides a control signal to gate 45 to inhibit the supply of clock pulses from oscillator 80 to both counters 43 and 46 This inhibit is removed as soon as counter 43 is reloaded with new distance travelled information from shift register 42.

When the count of counter 46 reaches zero, indicating that the vehicle is at a node of junction, counter 46 provides a control signal to gate 45 to temporarily inhibit clock signals from oscillator 80 and a control signal to gate 13 of FIG. 3 to open the same. Following the opening of gate 13, programmed junction identity store 14 of FIG. 3 causes the appropriate one of gates 21 to 25 to FIG. 3 to open in order to load counter 46 with a count corresponding to the next inter-junction distance.

Referring to FIGS. 6 and 7, these show in detail logic circuitry which may form an implementation of programmed junction identity store 14 of FIG. 3. Alternatively of course this store may be realised by a suitably programmed computer. The circuit shown in FIG. 7 represents the logic which would be required for each of the "node" blocks 81 to 88 in FIG. 6. One node block would be provided for each road junction. In this example, for ease of showing, only direction of turn (to left or right) is considered without distinction being made between degrees of turn. The additional logic required to take into account degrees of turn will, it is believed, be self-evident. Each node is allowed four ports (A,B,C,D as shown in FIG. 6) which may or may not all be used. One circuit as shown in FIG. 7 would be provided for each node block and these circuits would be connected together as exemplified in FIG. 6 to form a pattern corresponding to the road network.

Referring specifically to FIG. 7, it will be seen that each input A,B,C and D is connected directly to the J input, and via an inverter 54, 55, 56 and 57 respectively to the K input of a JK bistable circuit 58, 59, 60 and 61. The Q output of JK bistable circuit 58 is connected to one input terminal of each of three AND gates 62, 63 and 64. The Q output terminal of JK bistable circuit 59 is similarly connected to one input of each of three AND gates 65, 66 and 67. The Q output terminal of JK bistable circuit 60 is connected to one input of each of three AND gates 68, 69 and 70. The Q output terminal of JK bistable circuit 61 is connected to one input terminal of each of three AND gates 71, 72 and 73. The second input terminal of each of AND gates 62, 65, 68 and 71 is connected to the "left turn signal" line 48. The second input terminal of each of AND gates 63, 66, 69 and 72 is connected to the "no turn signal" line 50. The second input of each of AND gates 64, 67, 70 and 73 is connected to the "right turn signal" line 49. Four output AND gates 74, 75, 76 and 77 are provided, the outputs of which are connected respectively to output terminals A, B, C and D. Each AND gate 74 to 77 has three input terminals. The input terminals of AND gate 74 are connected respectively to the output terminals of AND gates 67, 69 and 71. The input terminals of AND gate 75 are connected respectively to the output terminals of AND gate 62, 70 and 72. The input terminals of AND gate 76 are connected respectively to the output terminals of AND gates 63, 65 and 73. The input terminals of AND gate 77 are connected respectively to the output terminals of AND gates 64, 66 and 68.

The E terminal of each of the JK bistable circuits 58 to 61 is connected to a "Clear" lead in order to enable the bistable circuits to be cleared for initialisation purposes.

Each of the inverters 54 to 57 may comprise one type SN 7404 logic circuit. Each JK bistable circuit 58 to 61 may comprise two type SN 74107 logic circuits. Each AND gate 62 to 73 may comprise a type SN 7400 logic circuit. Each AND gate 74 to 77 may comprise two type SN 7410 logic circuits. The left turn signal lead 48, right turn signal lead 49 and no turn signal lead 50 are also connected via an OR gate and inverter to the CK terminals of the bistable circuits 58 to 61. Within the system of FIG. 6, of the bistable circuits 58 to 61 in all of the node blocks 81 to 88 only one bistable circuit would be energised (Q output logically true). This indicates that the vehicle is approaching the junction to which corresponds the node block containing that bistable circuit. The particular bistable circuit within the node block denotes the particular entry route to the junction. When a vehicle arrives at a junction either the "turn left" line 48 or the "turn right" line 49 or the "no turn" line 50 would be energised depending upon which of three detectors 51, 52 or 53 responded to the output of gate 4. Detector 51 is a left turn code detector, detector 52 is a right turn code detector and detector 53 is a no turn code detector. This energises, via the matrix, one of the outputs of the node block in which the bistable circuit is set which will in turn energise another bistable circuit in another node block and de-energise the original. Thus bistable circuits will be energised sequentially and will follow the process of the vehicle.

We claim:

1. A vehicle location system for locating a vehicle travelling over a predetermined network of routes comprising vehicle borne means for deriving information signals relating to the distance travelled by the vehicle, means for deriving information signals relating to changes in the direction of travel of the vehicle and means for transmitting both information signals to a base station and at said base station means for receiving said information signals, means for storing information representing distance between route junctions in said predetermined network, and means for computing from said received information signals and from said stored information the route between junctions on which the vehicle is travelling.

2. A system as claimed in claim 1 and wherein means are provided at said base station for determining the distance of the vehicle from the junction to which the vehicle is heading.

3. A system as claimed in claim 2 and wherein said last mentioned means comprises a store, means for entering into said store, a binary signal representing the distance between a junction being negotiated by said vehicle and a junction towards which the vehicle is heading and means for emptying said store in response to distance travelled information signals received from said vehicle.

4. A vehicle location system for locating a vehicle travelling over a predetermined network of routes comprising, carried by said vehicle, means for deriving information signals relating to the distance travelled by the vehicle, means for deriving information signals relating to changes in the direction of travel of said vehicle and means for transmitting both information signals to a base station and, at said base station, means for receiving both information signals, means for storing information relating to the turn characteristics of junctions in said network, means for storing information relating to the distances between junctions and means for computing, from both said information signals received from said vehicles and from said stored information, data concerning the location of said vehicle on said network.

5. A system as claimed in claim 4 and wherein said means carried by said vehicle for deriving information signals relating to the distance travelled by said vehicle is such as to provide a digital output and, at said base station, said computing means includes a digital "distance from junction" store which is arranged initially to contain a count appropriate to the distance between a junction last negotiated by the vehicle and the junction to which the vehicle is heading, means being provided for causing digital information signals relating to the distance travelled by said vehicle and received by said base station to reduce the count in said "distance from junction" store.

6. A system as claimed in claim 5 and wherein, at said base station, there is connected to said receiving means a gate to which received information signals relating to changes in the direction of travel of said vehicle are applied, said gate being arranged to be opened when the count of said "distance from junction" store attains a zero value and said gate being connected to apply, when opened, said last mentioned information signals to a programmable junction identity store which is programmed with signals relating to the turn characteristics of junctions in said network and which is arranged, in dependence upon the characteristics of said last mentioned information signals received from said gate, to provide an output which is indicative of the junction towards which the vehicle is then heading.

7. A system as claimed in claim 6 including a plurality of permanent stores and wherein said programmed junction identity store is arranged to control the writing into the "distance from junction" store of a count from an appropriate one of said plurality of permanent stores each storing a digital number corresponding to the distance between a different junction and the junction which precedes it.

8. A vehicle location system for locating a vehicle travelling over a predetermined network of routes having a plurality of junctions, comprising in combination:

a vehicle borne system comprising means for deriving first information signals relating to the distance travelled by the vehicle, means for deriving second information signals relating to change of direction of the vehicle at said junctions, means for serializing said first and second information signals, and means for transmitting the serialized first and second information signals; and a base station system comprising means for receiving said serialized first and second information signals, a programmed junction identity store means for identifying each junction-to-junction route of said network based upon arrival and direction of turn or each junction, a plurality of junction-to-junction distance stores having separate outputs for junction-to-junction distances, gate means connected to said junction-to-junction on distance stores and so controlled by said programmed junction identity store means as to transfer, when a junction is passed, a selected one of said junction-to-junction distances as an initial distance from junction information, distance from junction store means connected to said gate means for receiving said initial distance from junction information therefrom, and connected to said receiving means for receiving said first information signals and for operating on said distance from junction information contained in said distance from junction store means in accordance with said distance travelled as indicated by said first information signals, and second gate means between said receiving means and said programmed junction identity store means and so controlled by said distance from junction store means as to open said second gate means only when said distance from junction information indicates that said vehicle has arrived at a junction.

9. A vehicle location system as defined in claim 8 wherein said distance from junction means is a counter which receives said initial distance from junction information from a junction-to-junction distance store as controlled by said programmed junction identity store and which is successively counted down from said initial distance from junction information by each reception of said first information signal.

10. A vehicle location system for locating a vehicle travelling over a predetermined network of routes comprising vehicle borne means for deriving first information signals relating to the distance travelled by the vehicle, vehicle borne means for deriving second information signals relating to changes in the direction of travel of said vehicle, means for storing first data relating to the turn characteristics of junctions in said network, means for storing second data relating to the distance between junctions and means for computing, from said first and second information signals and said first and second data, a result concerning the location of said vehicle on said network.

* * * * *